US009336450B2

(12) United States Patent
Burry et al.

(10) Patent No.: US 9,336,450 B2
(45) Date of Patent: May 10, 2016

(54) METHODS AND SYSTEMS FOR SELECTING TARGET VEHICLES FOR OCCUPANCY DETECTION

(71) Applicant: Xerox Corporation, Norwalk, CT (US)

(72) Inventors: Aaron Michael Burry, Ontario, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 403 days.

(21) Appl. No.: 13/910,346

(22) Filed: Jun. 5, 2013

(65) Prior Publication Data

US 2014/0363051 A1    Dec. 11, 2014

(51) Int. Cl.
*G06K 9/20* (2006.01)
*G06K 9/00* (2006.01)

(52) U.S. Cl.
CPC .......... *G06K 9/2027* (2013.01); *G06K 9/00838* (2013.01)

(58) Field of Classification Search
None
See application file for complete search history.

(56) References Cited

U.S. PATENT DOCUMENTS

| | | | | |
|---|---|---|---|---|
| 2,769,165 A * | 10/1956 | Bower | ................... | G07F 17/145 194/901 |
| 5,696,503 A * | 12/1997 | Nasburg | ............... | G08G 1/0104 340/933 |
| 5,809,161 A * | 9/1998 | Auty | ......................... | G01P 3/38 340/937 |
| 6,442,474 B1 * | 8/2002 | Trajkovic | ............. | G08G 1/0175 348/149 |
| 7,091,880 B2 | 8/2006 | Sorensen | | |
| 7,786,897 B2 * | 8/2010 | Alves | ................... | G08G 1/0175 340/905 |
| 8,013,760 B2 | 9/2011 | Turnock et al. | | |
| 8,344,886 B2 | 1/2013 | Gravelle et al. | | |
| 9,064,406 B1 * | 6/2015 | Stevens | ..................... | G08G 1/00 |
| 2005/0270175 A1 * | 12/2005 | Peddie | .................... | E01F 9/065 340/907 |
| 2006/0287807 A1 * | 12/2006 | Teffer | ................ | G08G 1/00175 701/117 |
| 2009/0262189 A1 * | 10/2009 | Marman | .......... | G08B 13/19613 348/143 |
| 2010/0201505 A1 | 8/2010 | Honary et al. | | |
| 2013/0084890 A1 | 4/2013 | Smely et al. | | |
| 2013/0106622 A1 | 5/2013 | Paul et al. | | |
| 2013/0148845 A1 * | 6/2013 | Maeda | .................. | G01S 17/023 382/103 |
| 2014/0112537 A1 * | 4/2014 | Frank | ...................... | H04N 5/33 382/103 |
| 2014/0159925 A1 * | 6/2014 | Mimeault | ............... | G01S 17/58 340/935 |
| 2015/0046074 A1 * | 2/2015 | Challapali | ............. | G08G 1/081 701/117 |

* cited by examiner

Primary Examiner — Tsung-Yin Tsai
(74) Attorney, Agent, or Firm — Richard Krukar; Kermit D. Lopez; Luis M. Ortiz

(57) ABSTRACT

Methods and systems for selecting a target vehicle for occupancy detection utilizing vehicle identification information. The vehicle identification information (e.g., license plate information) can be obtained from a vehicle identification unit (e.g., ALPR) to identify a vehicle approaching a high occupancy measurement zone. The vehicle identification information from the vehicle identification unit can be transferred to a vehicle occupancy unit having a flash illuminator unit and an image-capturing unit. The flash illuminator unit and the image-capturing unit are not enabled if the vehicle's occupancy state has already been measured at a prior location based on the vehicle identification information. The vehicle occupancy detection unit and the vehicle identification unit work together in a coordinated fashion to reduce the number of times the flash illuminator unit needs to fire and extends the life of the illuminator unit, thus reducing the cost of maintenance.

20 Claims, 3 Drawing Sheets

METHODS AND SYSTEMS FOR SELECTING TARGET VEHICLES FOR OCCUPANCY DETECTION

FIELD OF THE INVENTION

Embodiments are generally related to HOV (High Occupancy Vehicle) lane and traffic management techniques. Embodiments are also related to ALPR (Automatic License Plate recognition) systems and methods. Embodiments are additionally related to the selection of target vehicles for occupancy detection.

BACKGROUND

Traffic congestion is a condition on a road network that occurs as use increases, and is characterized by slower speeds, longer trip times, and increased vehicular queuing. Several travel demand management techniques have been employed to alleviate traffic congestion. For example, HOV (High occupancy vehicle) lanes can be employed to encourage more efficient travel by requiring vehicles to have a minimum number of occupants in order to legally use the HOV lanes, and thus decrease the amount of vehicles on the roads. HOT (High Occupancy Toll) lanes typically involve a road-pricing scheme that provides motorists in a single-occupant vehicle access to the HOV lanes to legally drive in the less congested HOV lane.

Conventionally, the HOV lane enforcement and HOT lane tolling are performed manually by a police patrol visually observing the occupancy state of vehicles. In one prior art approach, a high power near infrared strobe illuminator is employed to automatically detect the number of occupants in the vehicle because of the properties of the windshield and side windows. Unfortunately, such high-powered strobe requires a large amount of time to recharge before the next flash event can occur. This recharge time effectively limits the volume of traffic that can be measured with this illumination approach. In another prior art approach, more expensive fast recharge illuminator or multiple sequenced illuminators may be employed to maintain the traffic volume requirements. The problem associated with this approach is that these types of illuminators tend to have shorter useful life spans, and so need to be changed more often. Unfortunately, changing the illuminator bulb is a costly maintenance activity since a lane closure is required.

Based on the foregoing, it is believed that a need exists for an improved method and system for selecting a target vehicle for occupancy detection utilizing vehicle identification information, as will be described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved HOV (High Occupancy Vehicle) lane enforcement methods and systems.

It is another aspect of the disclosed embodiments to provide for improved methods and systems for selecting a target vehicle for occupancy detection based on captured vehicle identification information.

The aforementioned aspects and other objectives and advantages can now be achieved as described herein. A method and system for selecting a target vehicle for occupancy detection utilizing vehicle identification information is disclosed herein. In an example embodiment, the vehicle identification information (e.g., a license plate information) can be obtained from an image-capturing unit associated with the vehicle identification unit (e.g., automated license plate recognition or ALPR) to identify a vehicle approaching a high occupancy measurement zone. The vehicle identification information from the vehicle identification unit can be transferred to a vehicle occupancy unit having a flash illuminator unit and an image-capturing unit. The flash illuminator unit and the image-capturing unit are not enabled if the vehicle's occupancy state has already been measured at a prior location based on the vehicle identification information. The vehicle occupancy detection unit and the vehicle identification unit work together in a coordinated fashion to reduce the number of times the flash illuminator unit needs to fire and extend the life of the illuminator unit, thereby reducing the cost of maintenance.

An allowance can be determined by calculating the number of miles the vehicle has driven on the roadway. A number of times the vehicle has been missed can also be tracked. A more complex trip information can be factored into the calculation of which vehicles to flash at a given measurement site and a given moment in time to encompass several different types of information. A RFID transponder (e.g., an E-Zpass® transponder) and/or an OBU (Onboard Unit) that utilizes a dedicated short range communications (DSRC) channel can be employed to communicate the vehicle identification information to the vehicle occupancy detection unit. A hardware limit can be addressed while the illuminator life span is increased by selectively flashing the vehicles. An occluded vehicle can be recorded, and additional occupancy detection may be performed at a later station by integrating the vehicle identification information. Such an approach extends the life of the flash illuminator unit by intelligently flashing the illuminator unit when an unknown occupancy state vehicles are being examined thus reducing the downtime of the traffic lane.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
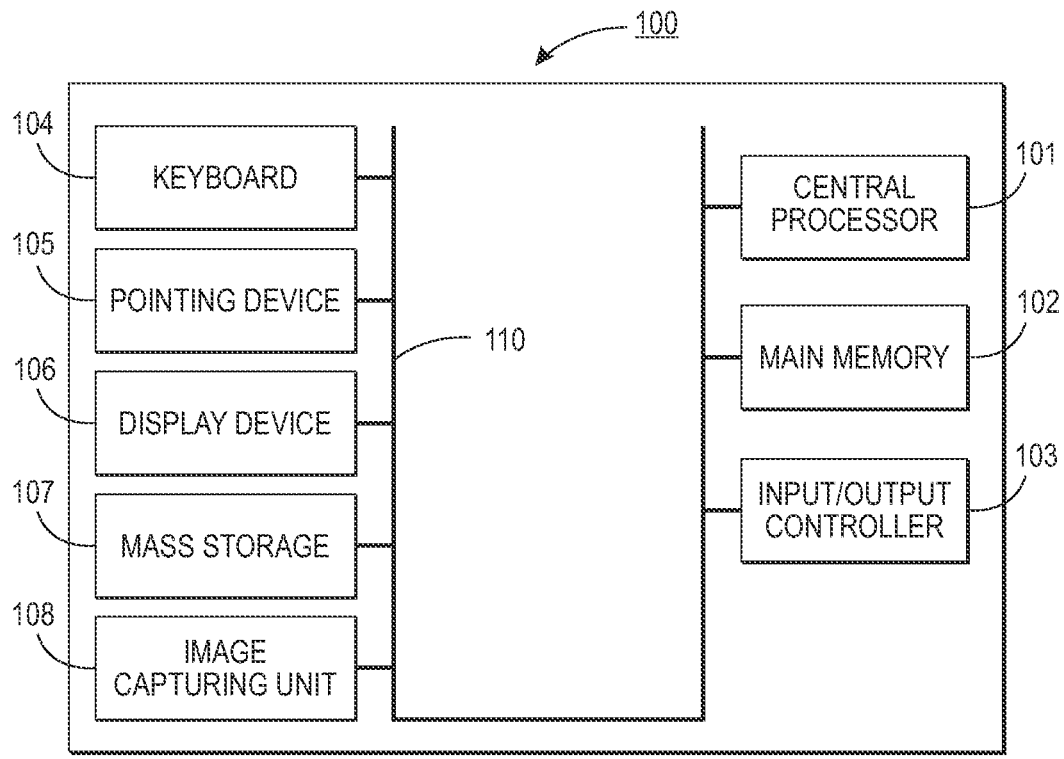
FIG. 1 illustrates a schematic view of a computer system, in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g. through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
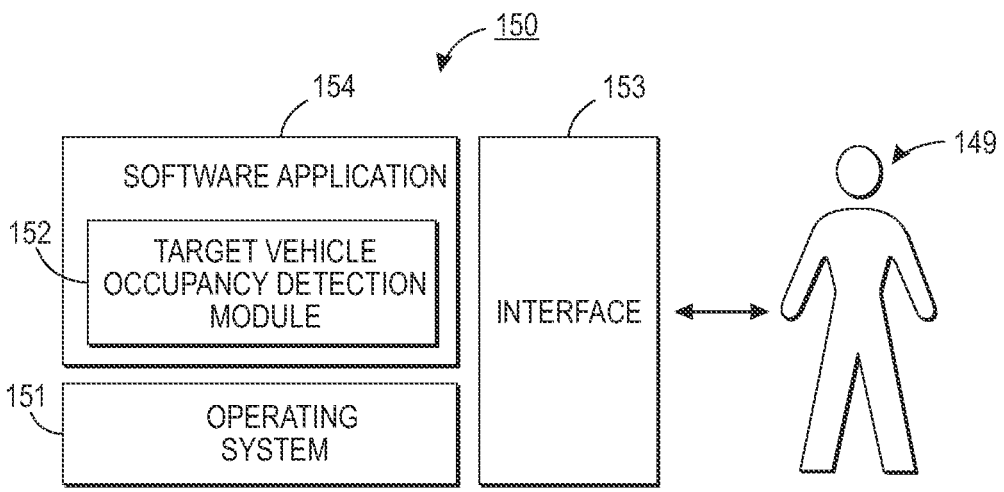
FIG. 2 illustrates a schematic view of a software system including a target vehicle occupancy detection module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device such as a mouse, track ball, pen device, etc.), a display device 106, a mass storage 107 (e.g., a hard disk), and an image capturing unit 108. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), can serve to display results, whereupon a user may supply additional inputs or terminate a particular session. In some embodiments, operating system 151 and interface 153 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 151 and interface 153. The software application 154 can include, for example, a target vehicle occupancy detection module 152 for selecting a target vehicle for occupancy detection utilizing vehicle identification information 345. The target vehicle occupancy detection module 152 can include instructions, for example, such the steps or logical operations of method 400 in FIG. 4 and discussed elsewhere herein.

FIGS. 1-2 are thus intended as examples and not as architectural limitations of the disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Figure 3:
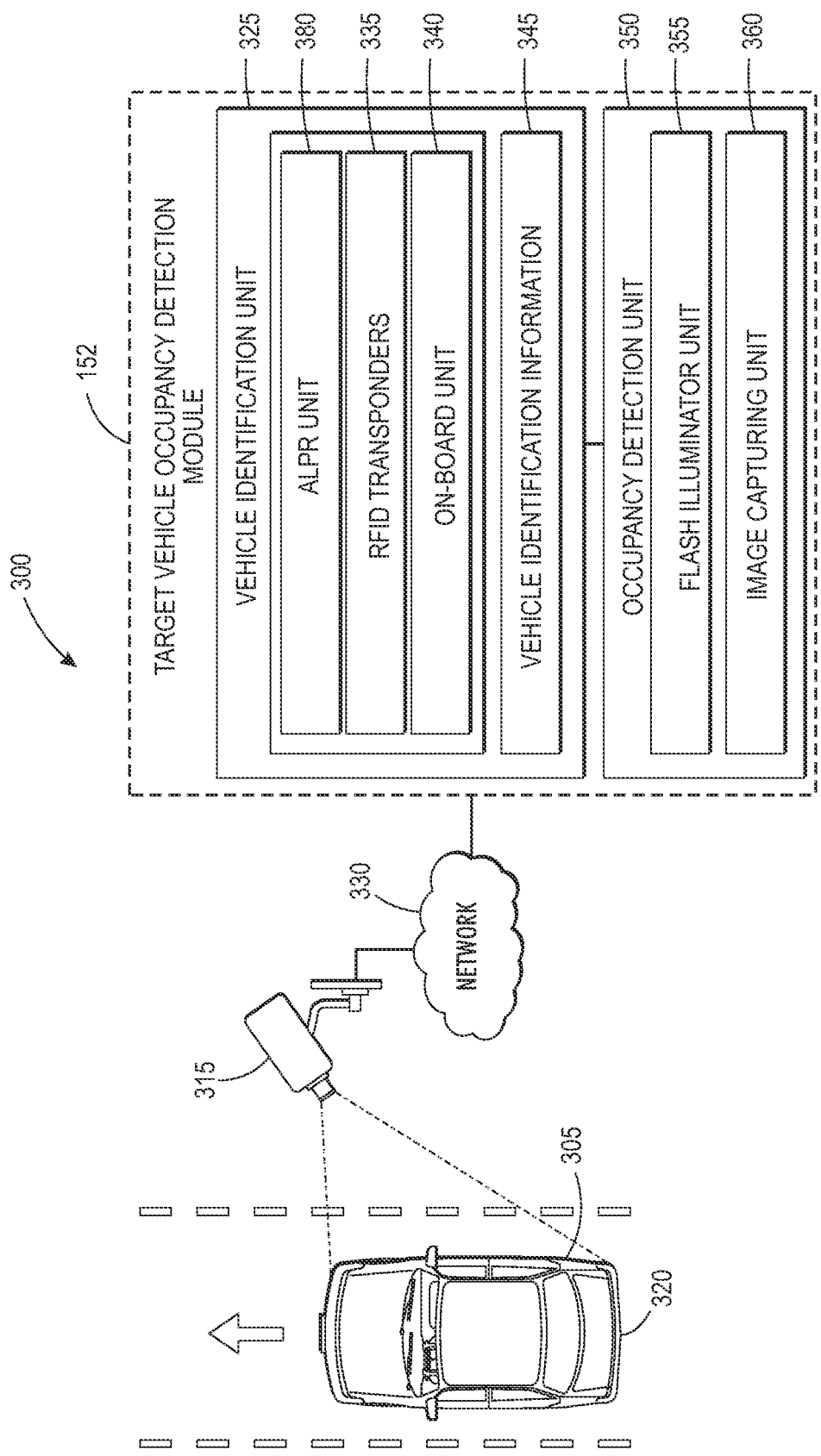
FIG. 3 illustrates a block diagram of a target vehicle occupancy detection system, which can be implemented in accordance with a preferred embodiment.

FIG. 3 illustrates a block diagram of a target vehicle occupancy detection system 300, which can be implemented in accordance with a preferred embodiment. Note that in FIGS. 1-4, identical or similar blocks are generally indicated by identical reference numerals. The target vehicle occupancy detection system 300 generally includes an image-capturing unit 315 (e.g., digital video camera) for capturing an image (or images, digital video, etc.) of a vehicle 305 within an effective field of view. The image-capturing unit 315 provides an image of a license plate 320 mounted on the rear of the vehicle 305. Note that the target vehicle occupancy detection system 300 is capable of reading the license plate on the front of the vehicle 305 as well as the rear. The image-capturing unit 315 can be operatively connected to an vehicle identification unit 325 via a network 330.

Note that the network 330 may employ any network topology, transmission medium, or network protocol. The network 330 may include connections such as wire, wireless communication links, or fiber optic cables. Network 330 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Network 330 can also be implemented as, for example, a client/server network or another network topology.

Note that the image-capturing unit 315 described in greater detail herein are analogous or similar to the image-capturing unit 108 of the data-processing system 100, depicted in FIG. 1. The image-capturing unit 315 may include built-in integrated functions such as image processing, data formatting, and data compression. Also, the unit includes imager-positioning, range-finding, and a flash bulb.

The target vehicle occupancy detection module 152 can be configured to include a vehicle identification unit 325 and an occupancy detection unit 350. The system 300 requires the usage of ALPR image-capturing unit 315 along the roadway in conjunction with the occupancy measurement unit 350. The vehicle identification unit 325 provides vehicle identification information 345 (e.g., a license plate information) obtained from the image-capturing unit 360 to identify the vehicle 305 approaching a high occupancy measurement zone. Note that the vehicle identification unit 325 can be, for example, an ALPR unit 380, RFID transponder 335, and an onboard unit 340. The RFID transponder 335 such as an "E-Zpass®" transponder can be employed to identify the vehicle 305 instead of the ALPR unit 380. The onboard units 340 can use a dedicated short range communications (DSRC) channels to communicate vehicle identity to the vehicle occupancy detection unit 350.

The occupancy detection unit 350 can be configured to include a flash illuminator unit 355 and an image-capturing unit 360. The flash illuminator unit 355 and the image-capturing unit 360 are not enabled if the vehicle's occupancy state has already been measured at a prior location based on the vehicle identification information 345. The vehicle occupancy detection unit 350 and the vehicle identification unit 325 work together in a coordinated fashion to reduce the number of times the flash illuminator unit 355 needs to fire and extends the life of the illuminator unit 355, thus reducing the cost of maintenance.

A hardware limit can be addressed while the life span of the illuminator unit 355 is increased by selectively flashing the vehicles 305. The target vehicle occupancy detection module 152 records an occluded vehicle, and additional occupancy detection may be performed at later stations by integrating the vehicle identification information 345. The target vehicle occupancy detection module 152 provides an allowance by calculating a number of miles the vehicle 305 has been on the roadway. The target vehicle occupancy detection module 152 also tracks a number of times the vehicle 305 has been missed. A more complex trip information can be included into the calculation of which vehicles to flash at a given measurement site and a given moment in time, for example, general travel trends and per vehicle travel trends.

The general travel trends are equivalent to learning patterns such as "vehicles that enter the NYS Thruway at the Henrietta exit (46) are not likely to get off at exit 47". Although not as accurate as per vehicle trends (since they function more or less based on average behaviors), this type of approach requires less information storage. The per vehicle travel approach "learns" that the vehicle with license plate "ABC-1234" tends to enter the roadway at exit 5 and stay on until exit 10, whereas the car with plate "BBC-5678" enters at exit 5 and typically only stays on until exit 7. This type of per vehicle tracking successfully captures the occupancy of individual vehicles by weighting its capture decisions appropriately. Since transportation data suggests that up to 70% of the weekly traffic in large cities is due to commuters, for example, it is possible to mine these types of consistent travel trends for individuals.

Figure 4:
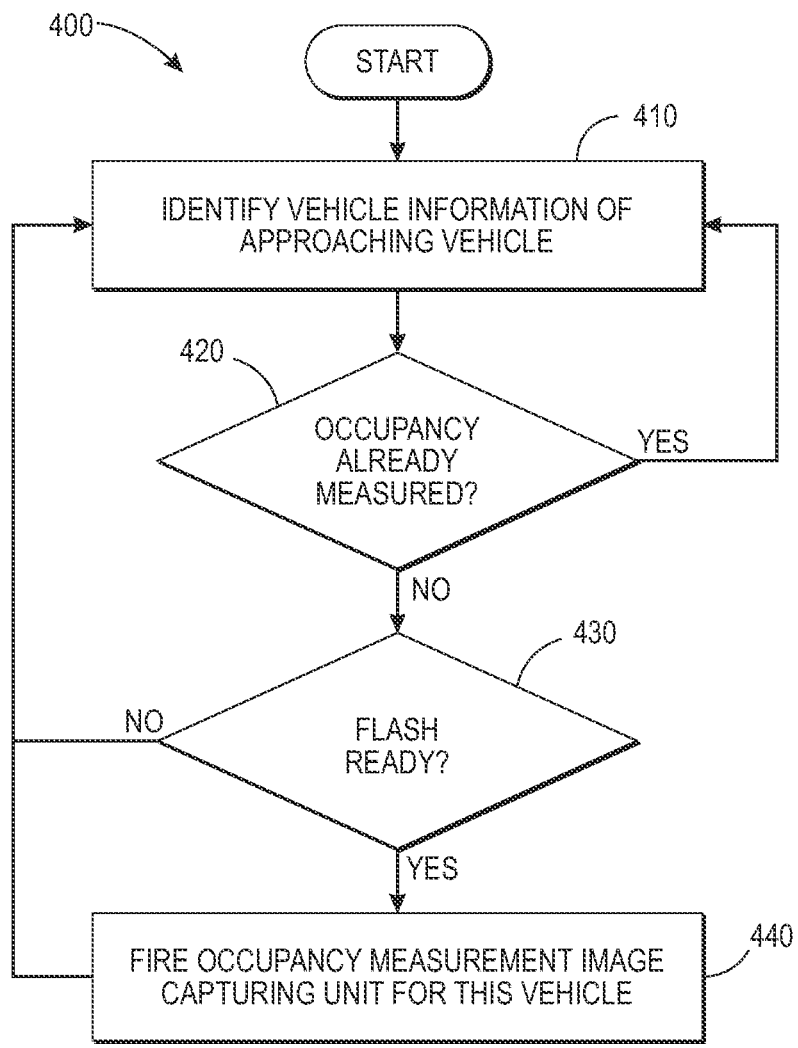
FIG. 4 illustrates a high level flow chart of operations illustrating logical operational steps of a method for selecting a target vehicle for occupancy detection utilizing vehicle identification information, in accordance with the disclosed embodiments.

FIG. 4 illustrates a high level flow chart of operations illustrating logical operational steps of a method 400 for selecting of a target vehicle for occupancy detection utilizing vehicle identification information 345, in accordance with the disclosed embodiments. It can be appreciated that the logical operational steps shown in FIG. 4 can be implemented or provided via, for example, a module such as module 152 shown in FIG. 2 and can be processed via a processor such as, for example, the processor 101 shown in FIG. 1. Initially, as indicated at block 410, the vehicle information 345 of approaching vehicle 305 can be identified. A determination can be made whether the occupancy has been already measured, as shown at block 420. If the occupancy has already been measured, then the vehicle information 345 of the next approaching vehicle 305 can be identified.

Otherwise, another determination can be made whether the illuminator unit 355 flash is ready, as illustrated at block 430. If the illuminator unit 355 flash is ready, the occupancy measurement image-capturing unit 360 can be fired for the vehicle, as indicated at block 440. If the illuminator unit 355 flash is not ready, the vehicle information 345 of the next approaching vehicle can be identified. The occupancy detection system 300 can differentiate between vehicles which have already been measured, and those which have not utilizing the vehicle identification information. Such an approach extends the life of the flash illuminator unit 355 by intelligently flashing the illuminator unit 355 when an unknown occupancy state vehicles are being examined thus reducing the downtime of the traffic lane with potentially higher throughput.

Based on the foregoing, it can be appreciated that a number of different embodiments are disclosed herein. For example, in one embodiment, a method can be implemented for the selection of a target vehicle for occupancy detection. Such a method can include the steps or logical operations of, for example: obtaining vehicle identification information of a vehicle such as, for example, the vehicle 305 shown in FIG. 3 via an image-capturing unit 315 associated with a vehicle identification unit 325 to identify the vehicle as the vehicle approaches a high occupancy measurement zone; transferring the vehicle identification information from the vehicle identification unit 325 to an occupancy detection unit 350 having a flash illuminator unit 355 and an image-capturing unit 315; and enabling the flash illuminator unit 355 and the image-capturing unit 315 if the vehicle occupancy state has not already been measured at a prior location based on the vehicle identification information reducing the number of times the flash illuminator unit 355 needs to fire and extending the life of the illuminator unit 355.

In another embodiment, the vehicle identification information can include (but is not limited to), for example, license plate data. In yet another embodiment, a step or logical operation can be implemented for configuring the vehicle identification unit 325 to comprise at least one of the following: an automatic license plate recognition engine; a radio-frequency identification transponder; and/or an onboard unit that utilizes a dedicated short range communication channel. In other embodiments, steps or logical operations can be implemented for providing an allowance by calculating the number of miles the vehicle has been on the roadway and tracking the number of times the vehicle has been missed utilizing the occupancy detection unit 350.

In yet another embodiment, a step or logical operation can be implemented for factoring more complex trip information into a calculation of which vehicles to flash at a given measurement site and a given moment in time to encompass a plurality of information. In still another embodiment, a step or logical operation can be implemented for addressing a hardware limit while the illuminator life span is increased by selectively flashing the vehicle. In other embodiments, a step or logical operation can be implemented for recording an occluded vehicle and performing an additional occupancy detection at a later station by integrating the vehicle identification information.

In another embodiment, a system for selection of a target vehicle for occupancy detection can be implemented. Such a system can include, for example, a vehicle identification unit 325 (via, for example, the image-capturing unit 315 associated with the vehicle identification unit 325) that is capable of identifying the vehicle 305 as the vehicle 305 approaches a high occupancy measurement zone. Such a system can further include an occupancy detection unit 350. The vehicle identification information can be transferred from the vehicle identification unit 325 to the occupancy detection unit 350. Such an occupancy detecting unit 350 can include, for example, a flash illuminator unit 355 and, for example, the image-capturing unit 315 such that the flash illuminator unit 355 and the image-capturing unit 315 are enabled, if the vehicle occupancy state has not already been measured at a prior location based on the vehicle identification information. This arrangement can assist in reducing the number of times the flash illuminator unit 355 is required to fire and in extending the life of the illuminator unit 355.

In some system embodiments, the vehicle identification information can include, for example, license plate data. In other embodiments, the vehicle identification unit 325 can include, for example, at least one of the following types of units: an automatic license plate recognition engine; a radio-frequency identification transponder; and an onboard unit that utilizes a dedicated short range communication channel. In yet another system embodiment, an allowance may be provided by calculating the number of miles the vehicle has been on the roadway and the number of times the vehicle has been missed is tracked utilizing the occupancy detection unit 350. In another system embodiment, more complex trip information is capable of being factored into a calculation of which vehicles to flash at a given measurement site and a given moment in time to encompass a plurality of information. In still another system embodiment, a hardware limit can be addressed while the illuminator life span is increased by selectively flashing the vehicle. In other system embodiments, a memory can be implemented for a memory for recording an occluded vehicle and a processor can also be provided for performing an additional occupancy detection at a later station by integrating the vehicle identification information.

In yet another embodiment, a system for selection of a target vehicle for occupancy detection can be implemented. Such a system can include, for example, a processor, a data bus coupled to the processor, and a computer-usable medium embodying computer program code, the computer-usable medium being coupled to the data bus. Such computer program code can include instructions executable by the processor and configured, for example, for: obtaining vehicle identification information of a vehicle via an image-capturing unit 315 associated with a vehicle identification unit 325 to identify the vehicle as the vehicle approaches a high occupancy measurement zone; transferring the vehicle identification information from the vehicle identification unit 325 to an occupancy detection unit 350 having a flash illuminator unit 355 and an image-capturing unit 315; and enabling the flash illuminator unit 355 and the image-capturing unit 315 if the vehicle occupancy state has not already been measured at a prior location based on the vehicle identification information reducing the number of times the flash illuminator unit 355 needs to fire and extending the life of the illuminator unit 355.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A method for selection of a target vehicle for occupancy detection, the method comprising:
    obtaining first vehicle identification information from a vehicle identification unit wherein the first vehicle identification information identifies a first vehicle as the first vehicle approaches a high occupancy measurement zone;
    determining that a first vehicle occupancy state has already been measured wherein the first vehicle occupancy state indicates how many people are in the first vehicle;
    electing to not measure the first vehicle occupancy state within the high occupancy measurement zone at least in part because the first vehicle occupancy state has already been measured;
    obtaining second vehicle identification information from the vehicle identification unit wherein the second vehicle identification information identifies a second vehicle as the second vehicle approaches the high occupancy measurement zone;
    determining that a second vehicle occupancy state has not already been measured wherein the second vehicle occupancy state indicates how many people are in the second vehicle;
    electing to measure the second vehicle occupancy state within the high occupancy measurement zone at least in part because the second vehicle occupancy state has not already been measured;
    providing the second vehicle identification information to an occupancy detection unit having a flash illuminator unit and an image-capturing unit wherein the occupancy detection unit measures how many people are in a measured vehicle; and
    determining, by the occupancy detection unit, the second vehicle occupancy state.

2. The method of claim 1 wherein the first vehicle identification information comprises first vehicle license plate data and wherein the second vehicle identification information comprises second vehicle license plate data.

3. The method of claim 1 wherein the vehicle identification unit further comprises a radio-frequency identification transponder.

4. The method of claim 1 further comprising:
    providing an allowance by calculating a number of miles the first vehicle has been on the roadway; and
    tracking a number of times the first vehicle has been missed utilizing the occupancy detection unit.

5. The method of claim 1 further comprising factoring a more complex trip information into the election to not measure the first vehicle occupancy state and the election to measure the second vehicle occupancy state.

6. The method of claim 1 further comprising addressing a hardware limit wherein the illuminator life span is increased by electing to not measure the first vehicle occupancy state.

7. The method of claim 1 further comprising recording an occluded vehicle and performing an additional occupancy detection to determine how many people are in the occluded vehicle at a later station by integrating occluded vehicle identification information wherein the vehicle identification unit obtains the occluded vehicle identification information.

8. A system for selection of a target vehicle for occupancy detection, the system comprising:
    a vehicle identification unit wherein the vehicle identification unit obtains first vehicle identification information that identifies a first vehicle as the first vehicle approaches a high occupancy measurement zone, and wherein the vehicle identification unit obtains second vehicle identification information that identifies a second vehicle as the second vehicle approaches the high occupancy measurement zone;
    an occupancy detection unit having a flash illuminator unit and an image-capturing unit wherein the occupancy detection unit measures how many people are in a measured vehicle;
    a first vehicle occupancy state wherein the first vehicle occupancy state indicates how many people are in the first vehicle, and wherein the first vehicle occupancy state is not measured by the occupancy detection unit because, at least in part, the first vehicle occupancy state is already known; and
    a second vehicle occupancy state wherein the second occupancy state indicates how many people are in the second vehicle, wherein the second vehicle occupancy state is not known before the second vehicle enters the high occupancy measurement zone, and wherein the second vehicle occupancy state is measured by the occupancy detection unit because, at least in part, the second vehicle occupancy state is already known.

9. The system of claim 8 wherein the first vehicle identification information comprises first vehicle license plate data and wherein the second vehicle identification information comprises second vehicle license plate data.

10. The system of claim 8 wherein the vehicle identification unit comprises a radio-frequency identification transponder.

11. The system of claim 8 wherein:
    an allowance is provided by calculating a number of miles the first vehicle has been on the roadway; and
    a number of times the vehicle has been missed is tracked utilizing the occupancy detection unit.

12. The system of claim 8 wherein the first vehicle occupancy state is not measured by the occupancy detection unit because of, in part, more complex trip information, and wherein the second vehicle occupancy state is measured by the occupancy detection unit because of, in part, the more complex trip information.

13. The system of claim 8 further comprising a hardware limit wherein addressing the hardware limit increases the illuminator life span by electing to not measure the first vehicle occupancy state.

14. The system of claim 8 further comprising:
a memory for recording an occluded vehicle wherein the vehicle identification unit obtains occluded vehicle identification information; and
a processor for performing an additional occupancy detection at a later station by integrating the occluded vehicle identification information.

15. A system for selection of a target vehicle for occupancy detection, said system comprising:
a processor;
a data bus coupled to said processor; and
a computer-usable medium embodying computer program code, said computer-usable medium being coupled to said data bus, said computer program code comprising instructions executable by said processor and configured for:
obtaining first vehicle identification information from a vehicle identification unit wherein the first vehicle identification information identifies a first vehicle as the first vehicle approaches a high occupancy measurement zone;
determining that a first vehicle occupancy state has already been measured wherein the first vehicle occupancy state indicates how many people are in the first vehicle;
electing to not measure the first vehicle occupancy state within the high occupancy measurement zone at least in part because the first vehicle occupancy state has already been measured;
obtaining second vehicle identification information from the vehicle identification unit wherein the second vehicle identification information identifies a second vehicle as the second vehicle approaches the high occupancy measurement zone;
determining that a second vehicle occupancy state has not already been measured wherein the second vehicle occupancy state indicates how many people are in the second vehicle;
electing to measure the second vehicle occupancy state within the high occupancy measurement zone at least in part because the second vehicle occupancy state has not already been measured;
providing the second vehicle identification information to an occupancy detection unit having a flash illuminator unit and an image-capturing unit wherein the occupancy detection unit measures how many people are in a measured vehicle; and
determining, by the occupancy detection unit, the second vehicle occupancy state.

16. The system of claim 15 wherein the first vehicle identification information comprises first vehicle license plate data, wherein the second vehicle identification information comprises second vehicle license plate data, and wherein the vehicle identification unit comprises a radio-frequency identification transponder.

17. The system of claim 15 wherein the instructions are further configured for:
providing an allowance by calculating a number of miles the first vehicle has been on the roadway; and
tracking a number of times the first vehicle has been missed utilizing the occupancy detection unit.

18. The system of claim 15 wherein the instructions are further configured for factoring a more complex trip information into the election to not measure the first vehicle occupancy state and the election to measure the second vehicle occupancy state.

19. The system of claim 15 wherein the instructions are further configured for addressing a hardware limit wherein the illuminator life span is increased by electing to not measure the first vehicle occupancy state.

20. The system of claim 15 wherein the instructions are further configured for recording an occluded vehicle and performing an additional occupancy detection to determine how many people are in the occluded vehicle at a later station by integrating occluded vehicle identification information wherein the vehicle identification unit obtains the occluded vehicle identification information.

* * * * *